UNITED STATES PATENT OFFICE.

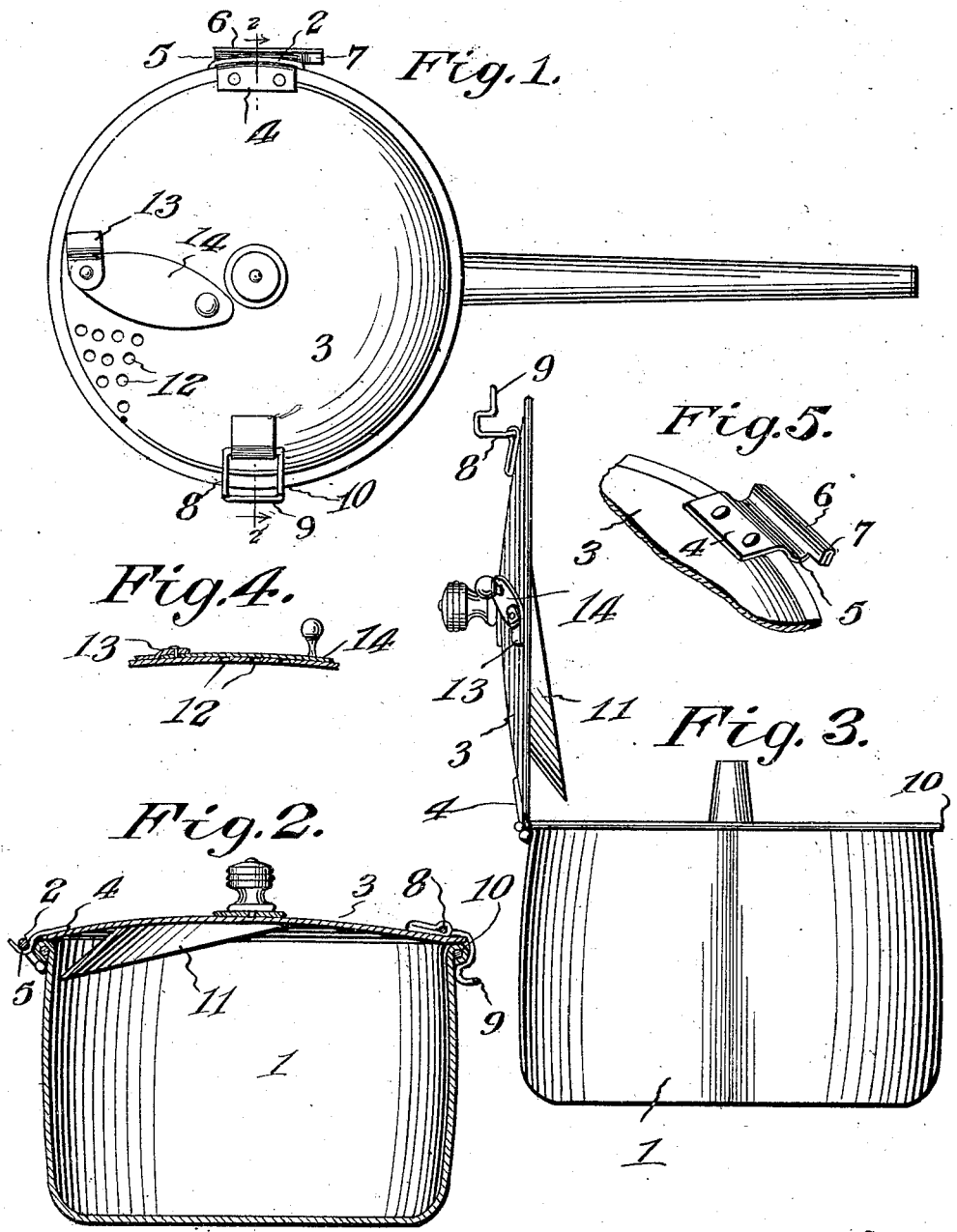

ROBERT C. PAULUS, OF PASO ROBLES, CALIFORNIA.

COOKING UTENSIL.

No. 906,272.  Specification of Letters Patent.  Patented Dec. 8, 1908.

Application filed June 10, 1908. Serial No. 437,757.

*To all whom it may concern:*

Be it known that I, ROBERT C. PAULUS, a citizen of the United States, residing at Paso Robles, in the county of San Luis Obispo and State of California, have invented new and useful Improvements in Cooking Utensils, of which the following is a specification.

The invention relates to an improvement in cooking utensils, and is particularly directed to a cover for such utensils which will be automatically supported in open position and which is provided with means for forming a vent for the utensil, and with means for draining the condensations from the inside of the cover back into the vessel when the cover is elevated.

The main object of the present invention is the provision of a cover for cooking utensils formed with a hinge member arranged to coöperate with a receiving member on the utensil and so formed as to automatically support the cover in elevated position when raised, the construction including the formation of a drain flange on the interior of the cover and a series of openings adapted to be controlled by a valve section to afford vent openings for the utensil, when desired.

The invention in the preferred form of details will be described in the following specification, reference being had particularly to the accompanying drawing, in which—

Figure 1 represents a plan illustrating the construction of my cover and showing the same applied to a cooking utensil. Fig. 2 is a vertical central section of the same. Fig. 3 is an elevation with the cover raised. Fig. 4 is a broken sectional view illustrating the connection of the valve section. Fig. 5 is a broken perspective illustrating particularly the hinge member of the cover.

Referring particularly to the accompanying drawings, my improved cover is designed for use with a cooking utensil 1 which, in the form illustrated, is of the ordinary sauce-pan type. The utensil is provided at a point in its upper peripheral edge with a loop or eye member 2, the outer or operative cross bar of which is spaced a slight distance from the rim of the utensil.

The cover proper 3, which is, of course, of a size to snugly fit the utensil 1, is provided at a point in its peripheral edge with a hinge member 4 to coöperate with the loop 2 on the utensil. The member 4, which is preferably a section or strip of sheet metal, is secured to the body of the cover by rivets or other fastenings, and beyond the edge of the cover is formed with a transversely-disposed depression 5 designed to engage and form a pivotal connection with the cross bar of the loop 2. Beyond the depression, the material of the member 4 is projected forwardly at an angle to the main plane of the member to provide a flange 6, said flange being preferably formed and strengthened by doubling the material upon itself, as clearly shown in Fig. 5. At one end, the flange 6 terminates in coincidence with the edge of the member 4, while at the opposite end said flange projects beyond the adjacent edge of the member to provide a stop 7, the purpose of which will presently appear. The width of the member 4 along the line of the depression 5 is approximately equal to the interior width of the loop 2, so that when the member 4 is engaged in said loop, the wall of the depression will bear throughout its length on the outer or spaced cross bar of the loop.

At a point diametrically opposite the member 4, the cover 3 is provided with a spring catch 8, which is of approximately U form having the terminal of one arm pivotally secured to the lid and the terminal of the opposite arm bent laterally to said arm to provide a finger member 9. The spacing of the arms of the member 8 is such as to snugly engage the bead rim 10 of the body of the utensil, so that the member 8 will, in use, form a catch for securing the cover in closed position, as clearly shown in Fig. 2.

Within the cover and throughout a point about coextensive with half the circumference thereof, I provide a drain flange 11, preferably a strip of material having its greatest width at a point midway between its ends and gradually narrowed from said point of greatest width to the ends. The flange 11 is secured on the inner side of the cover so that its free or relatively lower edge is spaced from the inner surface of the cover, the body of the flange inclining outwardly and downwardly from its point of connection with the cover. In the use of the flange, all vapor condensing on the inner surface of the cover will, when the cover is elevated in the position shown in Fig. 3, be directed to said flange and guided by the latter over the body of the utensil into which it will thus be directed. The cover is also formed with a series of openings 12 arranged in regular or irregular order, adjacent which openings there is pivoted, in a member 13 fixed on the cover, a valve section 14 adapted for manual control to close any one or more openings 12. By this means, a proper venting of the utensil without the necessity of elevating the cover, is provided, it being understood that the operator may, by controlling the vent openings, regulate the retention of the vapors within the utensil, as desired.

In connecting the cover to the utensil, the cover is tilted so as to direct the flange 6 through the loop 2 at an inclination, and the cross bar of the latter engaged in the depression 5. In this arrangement, a hinge connection between the cover and utensil is provided, which is serviceable for all ordinary purposes, the stop 7 serving, when the cover is elevated to the degree shown in Fig. 3, for engagement with the body of the utensil thereby supporting the cover in such elevated position without the necessity of other means.

The cover is to be constructed of any desired material and in such sizes and outline contours as will adapt it for convenient use with the particular utensil, it being understood that the present invention contemplates the use of any material and any size or contour for the cover.

Having thus described the invention, what I claim is:—

1. A cooking utensil, a loop member secured thereto, a cover for the utensil, and a hinge member carried by the cover, said hinge member being formed by a strip of material secured to the cover of a width to fit within the loop member, said strip projecting beyond the edge of the cover and being formed with a depression to engage one bar of the loop member and with a flange of greater length than the width of the loop member whereby to provide a flange extension beyond the loop member.

2. A cooking utensil, a loop member secured thereto, a cover for the utensil and a hinge member carried by the cover arranged to coöperate with the loop, said hinge member being formed of a strip of material secured to the cover and projected beyond the edge of the same, said strip being of a width corresponding to the interior width of the loop and being formed with a depression to engage one of the cross bars of the loop, the strip beyond the depression being formed with a flange projecting at an angle to the plane of the strip, said flange being longitudinally extended beyond one edge of the strip to form a stop in the elevation of the cover.

3. A cooking utensil, a cover therefor, a hinge connection between the cover and utensil, and a directing flange carried by the inner side of the cover and inclined outwardly and downwardly from said cover, the lower edge of the flange inclining downwardly with relation to the plane of the cover from the central portion of the cover toward the edge, the maximum length of the flange being arranged immediately adjacent the hinge connection between the cover and utensil.

In testimony whereof I affix my signature in presence of two witnesses.

ROBERT C. PAULUS.

Witnesses:
   J. POULSEN,
   JAMES PYE, Jr.